US012384013B2

(12) United States Patent
Wang et al.

(10) Patent No.: US 12,384,013 B2
(45) Date of Patent: Aug. 12, 2025

(54) ANGLE-ADJUSTABLE POWER TOOL

(71) Applicant: KUANI GEAR CO., LTD., New Taipei (TW)

(72) Inventors: Tung-Yao Wang, New Taipei (TW); Jia-Huei Liu, New Taipei (TW)

(73) Assignee: KUANI GEAR CO., LTD., Tnew Taipei (TW)

( * ) Notice: Subject to any disclaimer, the term of this patent is extended or adjusted under 35 U.S.C. 154(b) by 469 days.

(21) Appl. No.: 17/962,075

(22) Filed: Oct. 7, 2022

(65) Prior Publication Data

US 2024/0116163 A1 Apr. 11, 2024

(51) Int. Cl.
*B25F 5/02* (2006.01)
*B25B 21/00* (2006.01)

(52) U.S. Cl.
CPC ................ *B25F 5/02* (2013.01); *B25B 21/00* (2013.01)

(58) Field of Classification Search
CPC ........ B25B 21/00; B25B 23/0028; B25F 5/02
USPC ....................... 81/177.6, 177.7, 177.8, 177.9
See application file for complete search history.

(56) References Cited

U.S. PATENT DOCUMENTS 6,817,424 B1 * 11/2004 Su ............................ B25F 5/02 173/217
7,032,481 B2 * 4/2006 Li ....................... B25B 23/1427 81/475
9,956,676 B2 * 5/2018 Wong ....................... B24B 23/04
11,548,124 B2 * 1/2023 Ho ....................... B25B 23/0028
11,819,972 B1 * 11/2023 Hsieh .................... B24B 23/026
2020/0282531 A1 9/2020 Amash et al.

FOREIGN PATENT DOCUMENTS

CN 1317394 A 10/2001
EP 3208043 B1 8/2022
TW 418770 U 1/2001
TW M437768 U 9/2012
TW I762220 B 4/2022
TW I771012 B 7/2022

* cited by examiner

*Primary Examiner* — Hadi Shakeri
(74) *Attorney, Agent, or Firm* — RABIN & BERDO, P.C.

(57) ABSTRACT

An angle-adjustable power tool has a handle, a driving head, and a positioning group. The handle has an engaging mount and an engaging disk. The engaging mount is disposed on a top of the handle and has a communicating recess and a fixing recess. The engaging disk is mounted in the fixing recess of the engaging mount. The driving head is rotatably connected to the handle and has a pivot base and a head portion. The pivot base is disposed in a bottom of the driving head and is rotatably connected to the handle to dispose the engaging mount and the engaging disk between the handle and the pivot base. The positioning group is disposed between the handle and the driving head and has a positioning mount, an elastic element, an abutting mount, and a toggling element.

9 Claims, 11 Drawing Sheets

ANGLE-ADJUSTABLE POWER TOOL

BACKGROUND OF THE INVENTION

1. Field of the Invention

The present invention relates to a power tool, and more particularly to an angle-adjustable power tool with a simple structure, which may be positioned accurately and may save cost.

2. Description of Related Art

A conventional power tool is driven by eccentricity or gas to rotate a workpiece in a forward direction or a reverse direction. The conventional power tool has a handle and a driving head connected to the handle. When a user holds the handle and processes the workpiece by the driving head, a relative position between the user and the workpiece cannot be processed by the driving head, which will increase the inconvenience of use. Therefore, a pivot device is disposed between the handle and the driving head of the conventional power tool, and an angle between the driving head and the handle can be adjusted by the pivot device. Then the user can process the workpiece at a proper angle.

However, the conventional power tool can adjust the angle between the driving head and the handle by the pivot device to achieve an effect of convenient use. The pivot device disposed between the driving head and the handle lacks a stably positioned structure, so that the driving head may swing relative to the handle during processing after the angle adjustment, and may cause damage to the workpiece and work-safety hazards. Furthermore, if the conventional tool is driven by gas, in order to accurately transmit the gas to the driving head via the handle and the pivot device, the conventional power tool must be provided with a gas flow channel of a complex shape, causing difficulty in processing between the handle, the pivot device and the driving head, and this will increase the cost and time required for manufacturing the conventional power tool.

To overcome the shortcomings, the present invention tends to provide an angle-adjustable power tool to mitigate the aforementioned problems.

SUMMARY OF THE INVENTION

The main objective of the invention is to provide an angle-adjustable power tool with a simple structure, which may be positioned accurately, and may save cost.

An angle-adjustable power tool in accordance with the present invention has a handle, a driving head, and a positioning group. The handle has an engaging mount and an engaging disk. The engaging mount is disposed on a top of the handle and has a communicating recess and a fixing recess. The engaging disk is mounted in the fixing recess of the engaging mount. The driving head is rotatably connected to the handle and has a pivot base and a head portion. The pivot base is disposed in a bottom of the driving head and is rotatably connected to the handle to dispose the engaging mount and the engaging disk between the handle and the pivot base. The positioning group is disposed between the handle and the driving head and has a positioning mount, an elastic element, an abutting mount, and a toggling element.

Other objects, advantages and novel features of the invention will become more apparent from the following detailed description when taken in conjunction with the accompanying drawings.

DETAILED DESCRIPTION OF PREFERRED EMBODIMENTS

With reference to FIGS. 1 to 4, an angle-adjustable power tool in accordance with the present invention comprises a handle 10, a driving head 20, and a positioning group 30.

Figure 1:
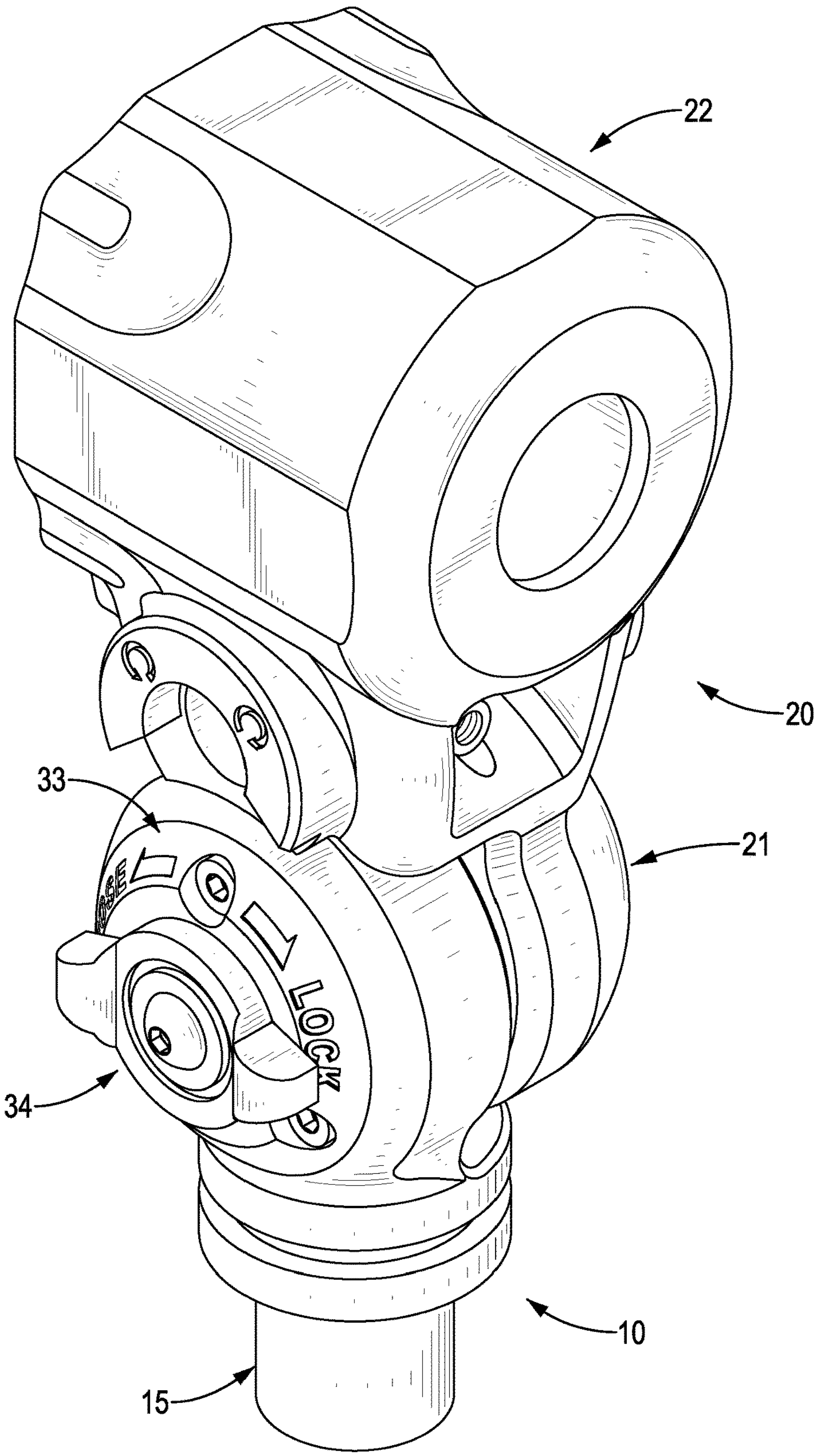
FIG. 1 is a perspective view of an angle-adjustable power tool in accordance with the present invention.
Figure 2:
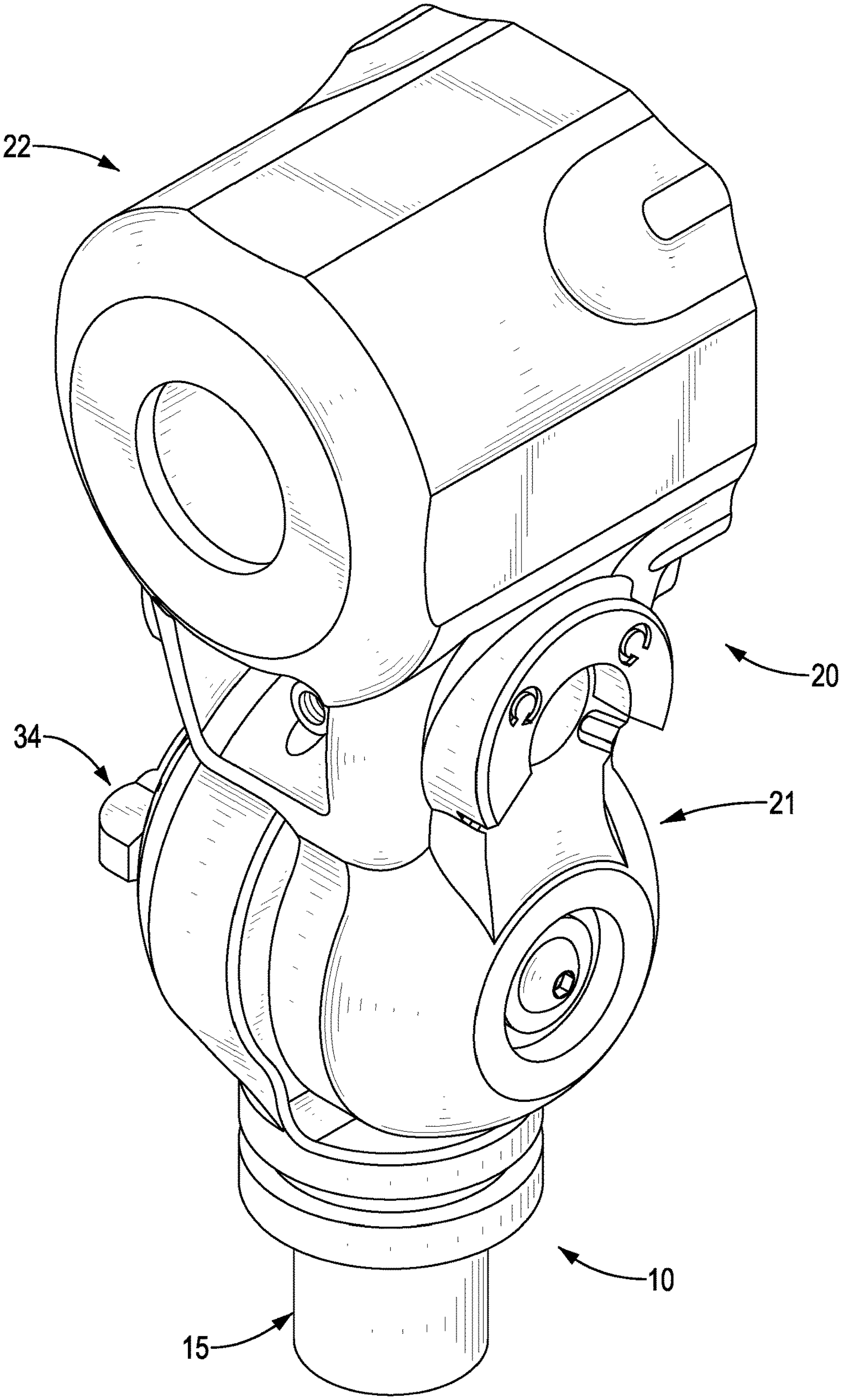
FIG. 2 is another perspective view of the angle-adjustable power tool in FIG. 1.
Figures 3A, 3B:
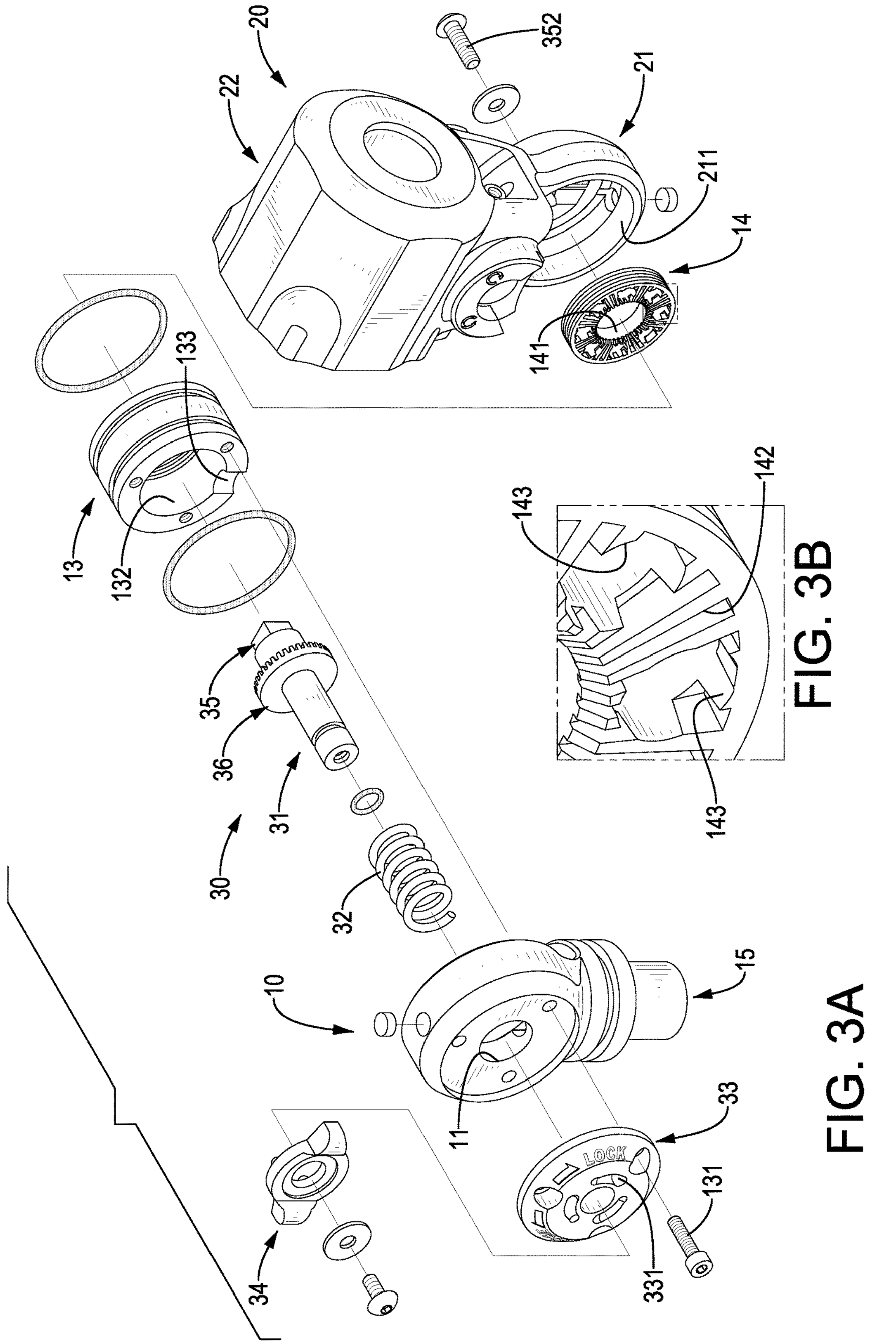
FIG. 3A is an exploded perspective view of the angle-adjustable power tool power tool in FIG. 1.
FIG. 3B is an enlarged perspective view of an engaging disk of the angle-adjustable power tool.
Figure 4:
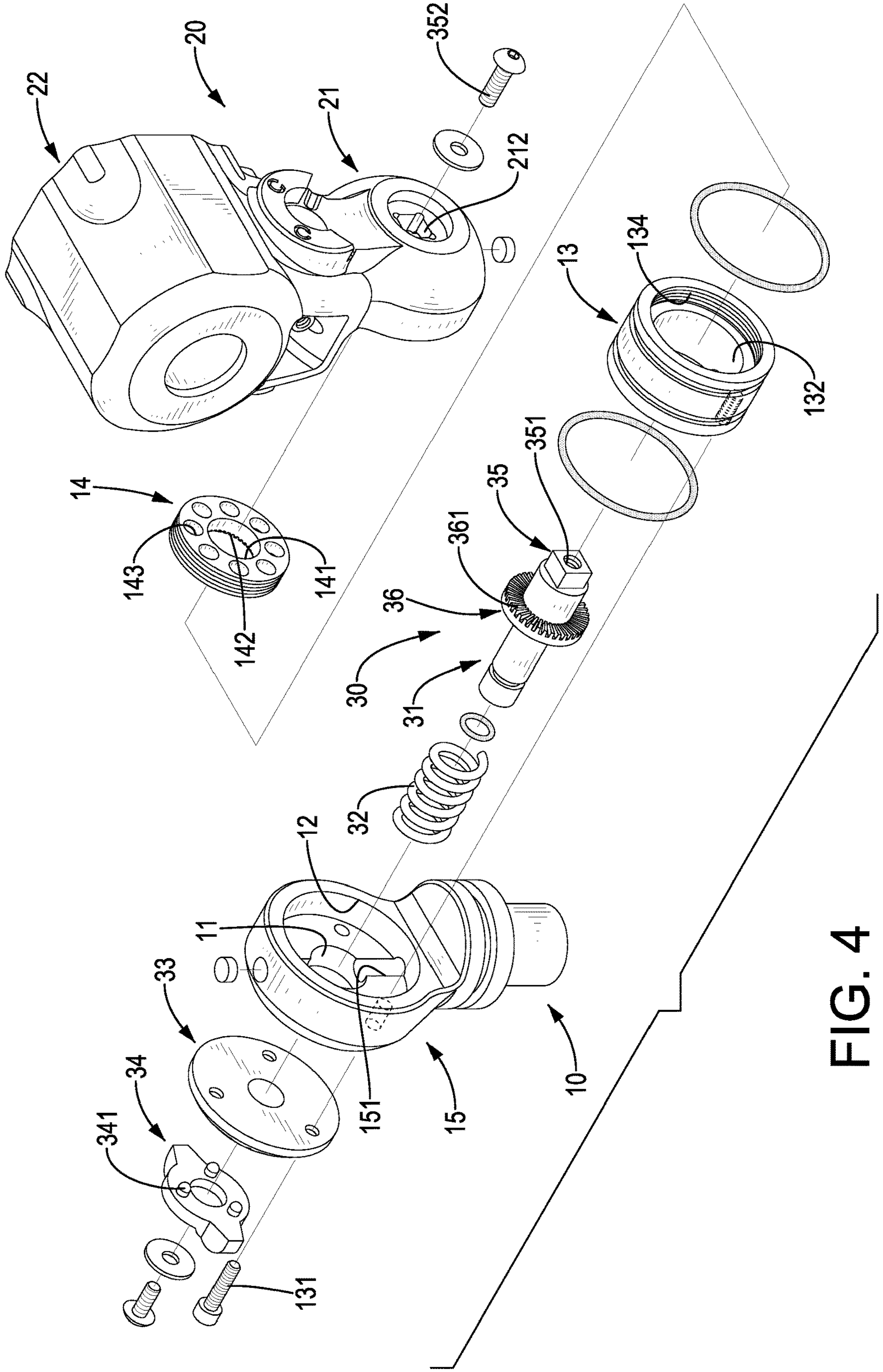
FIG. 4 is another exploded perspective view of the angle-adjustable power tool power tool in FIG. 1.
Figure 5:
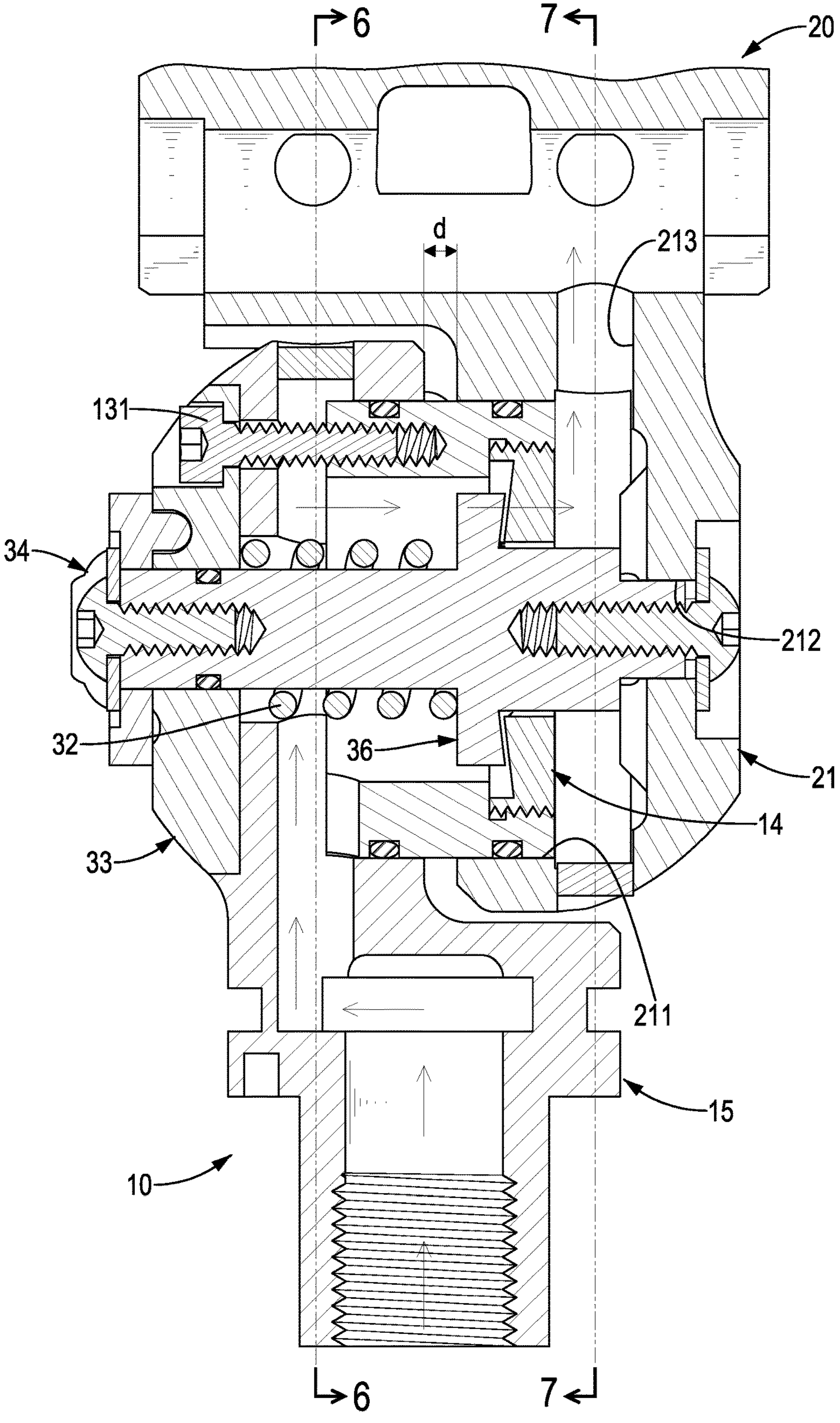
FIG. 5 is a side view of the angle-adjustable power tool in FIG. 1.
Figure 6:
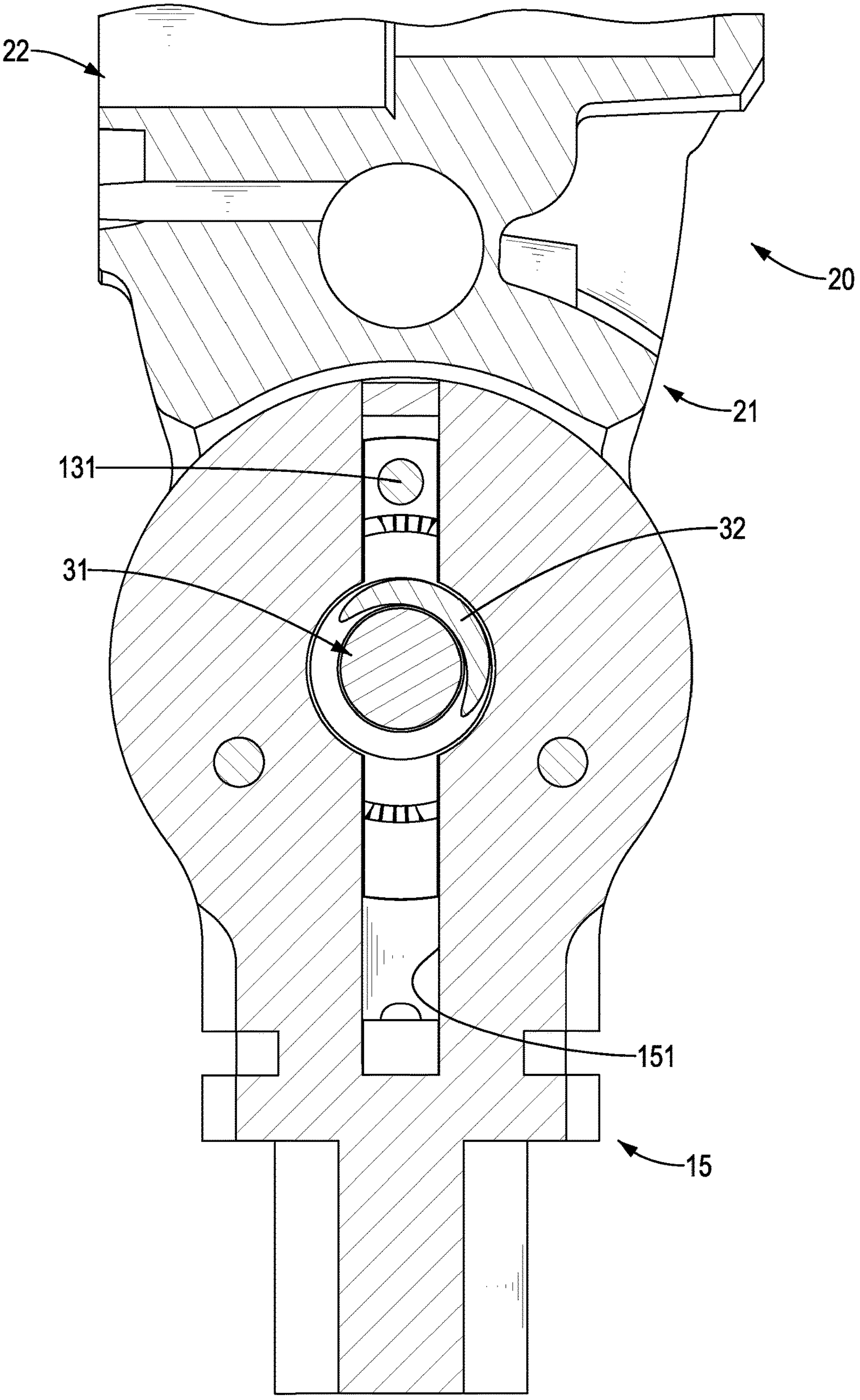
FIG. 6 is a side view of the angle-adjustable power tool along line 6-6 in FIG. 5.
Figure 7:
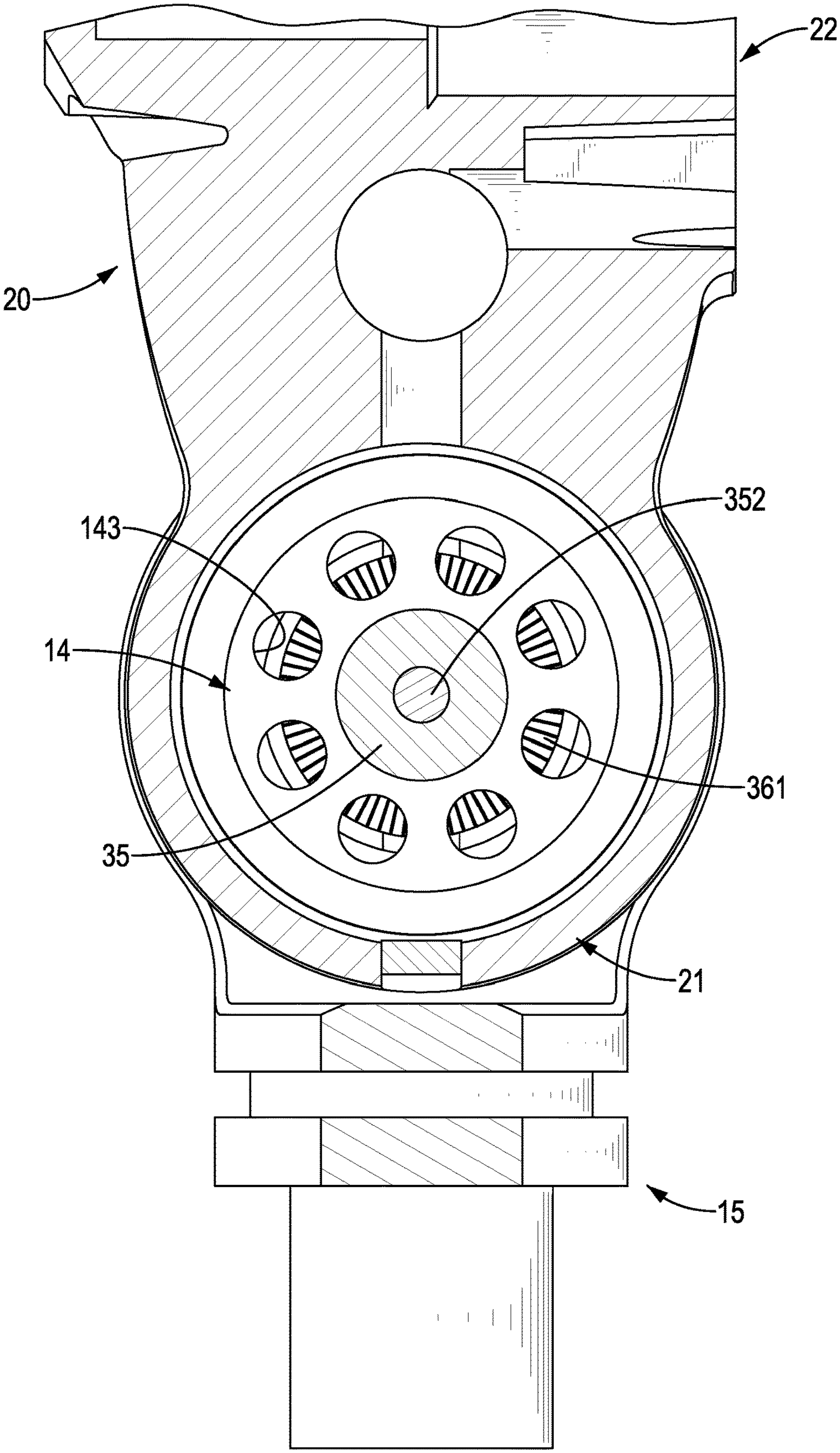
FIG. 7 is a side view of the angle-adjustable power tool along line 7-7 in FIG. 5.

With reference to FIGS. 1 to 4, the handle 10 has a mounting recess 11, a pivot recess 12, an engaging mount, and an engaging disk 14. The mounting recess 11 is transversally formed through a top of the handle 10 and faces to the driving head 20. The pivot recess 12 is transversally formed in the top of the handle 10 and communicates with the mounting recess 11. Preferably, the pivot recess 12 has an inner diameter larger than an inner diameter of the mounting recess 11 to form a stepper structure between the pivot recess 12 and the mounting recess 11. Furthermore, the handle 10 has a connecting head 15, and the mounting recess 11 and the pivot recess 12 are formed in the connecting head 15. In addition, a lower portion of the connecting head 15 of the handle 10 is connected to a housing to communicate with a high pressure air source via the housing. With reference to FIGS. 4 and 5, the connecting head 15 has a communicating slot 151 longitudinally formed in the connecting head 15 below the pivot recess 12 and communicating with the pivot recess 12 and the lower portion of the connecting head 15. Then the high pressure air source flows in the pivot recess 12 via the lower portion of the connecting head 15, the communicating slot 151, and the mounting recess 11.

With reference to FIGS. 3A and 4, the engaging mount 13 is mounted in the pivot recess 12, extends out of the connecting head 15, and may have multiple fasteners 131. The multiple fasteners 131 are mounted through the connecting head 15 to connect the engaging mount 13 securely to the connecting head 15. The engaging mount 13 has a communicating recess 132 formed in one of two sides of the engaging mount 13 that faces to the pivot recess 12. The engaging mount 13 has a notch 133 radially formed in a bottom of the corresponding side of the engaging mount 13 and communicating with the communicating recess 132 and the communicating slot 151. The engaging mount 13 has a fixing recess 134 formed in the other one of the two sides of the engaging mount 13, opposite to the pivot recess 12, and axially communicating with the communicating recess 132. The fixing recess 134 has an inner diameter smaller than an inner diameter of the communicating recess 132 to form an annular stepper between the fixing recess 134 and the communicating recess 132.

With reference to FIGS. 3A, 3B, and 4, the engaging disk 14 is securely connected to the engaging mount 13 and is mounted in the fixing recess 134. Preferably, the engaging disk 14 and the engaging mount 13 can be separated or integrally formed, which is not limited here. The engaging disk 14 has a through hole 141, multiple engaging units 142, and at least one communicating hole 143. The through hole 141 is axially formed through the engaging disk 14 and communicates with the communicating recess 132 via the fixing recess 134. The multiple engaging units 142 are formed on a side of the engaging disk 14 faced to the pivot recess 12 at spaced intervals and are arranged around the through hole 141. Preferably, each one of the multiple engaging units 142 is a tooth. The at least one communicating hole 143 is axially formed through the engaging disk 14 and the multiple engaging units 142 and communicates with the communicating recess 132. In addition, the engaging disk 14 has multiple communicating holes 143 surrounding the through hole 141.

With reference to FIGS. 3A, 4, and 5, the driving head 20 is pivotally connected to the handle 10 and has a pivot base 21 and a head portion 22. The pivot base 21 is disposed in a bottom of the driving head 20, is an annular structure, and is rotatably connected to the connecting head 15 of the handle 10. The pivot base 21 has a connecting recess 211, a mounting hole 212, and a communicating channel 213. The connecting recess 211 is transversally formed in a side of the pivot base 21 faced to the connecting head 15, and the engaging mount 13 that extends out of the connecting head 15 is mounted in the connecting recess 211. Then the engaging mount 13 is mounted between the pivot recess 12 of the connecting head 15 and the connecting recess 211 of the pivot base 21. With reference to FIG. 5, when the pivot base 21 is connected to the connecting head 15, a gap d is formed between an inner side of the pivot base 21 and an inner side of the connecting head 15. The mounting hole 212 is formed in an external surface of the pivot base 21, opposite to the connecting head 15, and communicates with the connecting recess 211. Preferably, the mounting hole 212 is a polygonal hole. The communicating channel 213 is longitudinally formed in the pivot base 21 and communicates with the at least one communicating hole 143 of the engaging disk 14 via the connecting recess 211. The head portion 22 is disposed on a top of the driving head 20, is connected to the pivot base 21, and has components such as cylinder, rotor, and steering device same as the conventional components, which are not to be described in detail. Furthermore, the communicating channel 213 communicates with an interior of the head portion 22.

With reference to FIGS. 3A to 5, the positioning group 30 is disposed between the handle 10 and the driving head 20 to fix an angle of the driving head relative to the handle 10, and has a positioning mount 31, an elastic element 32, an abutting mount 33, and a toggling element 34. The positioning mount 31 is rotatably and movably disposed between the connecting head 15 of the handle and the pivot base 21 of the driving head 20, selectively engages with the engaging disk 14, and has a linking head 35 and a positioning disk 36. The linking head 35 is disposed on one of two ends of the positioning mount 31, is connected to the mounting hole 212 of the pivot base 21 to enable the positioning mount 31 to rotate with the pivot base 21 via the linking head 35, and has a fixing hole 351 and a fixing bolt 352. The fixing hole 351 is axially formed in the linking head 35. The fixing bolt 352 is securely connected to the fixing hole 351 via the mounting hole 212 from the external surface of the pivot base 21 to connect the positioning mount 31 securely to the pivot base 21 via the linking head 35.

The positioning disk 36 is disposed on a middle of the positioning mount 31, is connected to the linking head 35, and is movably mounted in the communicating recess 132 of the engaging mount 13. The positioning disk 36 has a positioning structure 361 disposed on a side of the positioning disk 36 faced to the multiple engaging units 142 of the engaging disk 14 and selectively engaging with the multiple engaging units 142. Preferably, the positioning structure 361 is a gear that engages with the teeth. With reference to FIG. 5, the positioning structure 361 is a helical gear, and each one of the multiple engaging units 142 of the engaging disk 14 is a helical tooth structure that engages with the helical gear. The engagement between the helical gear and the helical tooth structure may improve the structural strength and stability between the positioning disk 36 and the engaging disk 14, and may reduce the backlash between the helical gear and the helical tooth structure, so that it can be engaged accurately.

With reference to FIGS. 2 to 5, the other one of the two ends of the positioning mount 31 extends out of the connecting head 15 via the communicating recess 132 of the engaging mount 13, the pivot recess 12, and the mounting recess 11. The elastic element 32 is disposed in the communicating recess 132 of the engaging mount 13, is mounted around the positioning mount 31, and has two ends. One of the two ends of the elastic element 32 abuts against the positioning disk 36 to push the positioning disk 36 to engage with the engaging disk 14, and the other one of the two ends of the elastic element 32 extends into the mounting recess 11. With reference to FIGS. 3A, 4, and 5, the abutting mount 33 is disposed on an external surface of the connecting head 15 opposite to the pivot base 21, is connected securely to the engaging mount 13 by the multiple fasteners 131, and abuts against the end of the elastic element 32 that extends into the mounting recess 11. The abutting mount 33 has at least one sliding slot 331 formed in an external surface of the abutting mount 33. Preferably, the abutting mount 33 has multiple sliding slots 331 annularly formed in the external surface of the abutting mount at spaced intervals.

The toggling element 34 is connected to the positioning mount 31 via the connecting head 15, rotatably abuts the abutting mount 33, and has at least one protrusion 341 formed on and protruded from a side of the toggling element 34 faced to the abutting mount 33. The at least one protrusion 341 is selectively mounted in the at least one sliding slot or abuts against the external surface of the abutting mount 33. Then the positioning mount 31 is moved relative to the engaging disk 14 with the rotation of the toggling element 34 to separate the positioning disk 36 from the engaging disk 14, and the pivot base 21 is moved toward the connecting head 15 by the positioning mount 31 to reduce the gap d between the pivot base 21 and the connecting head 15.

Figure 8:
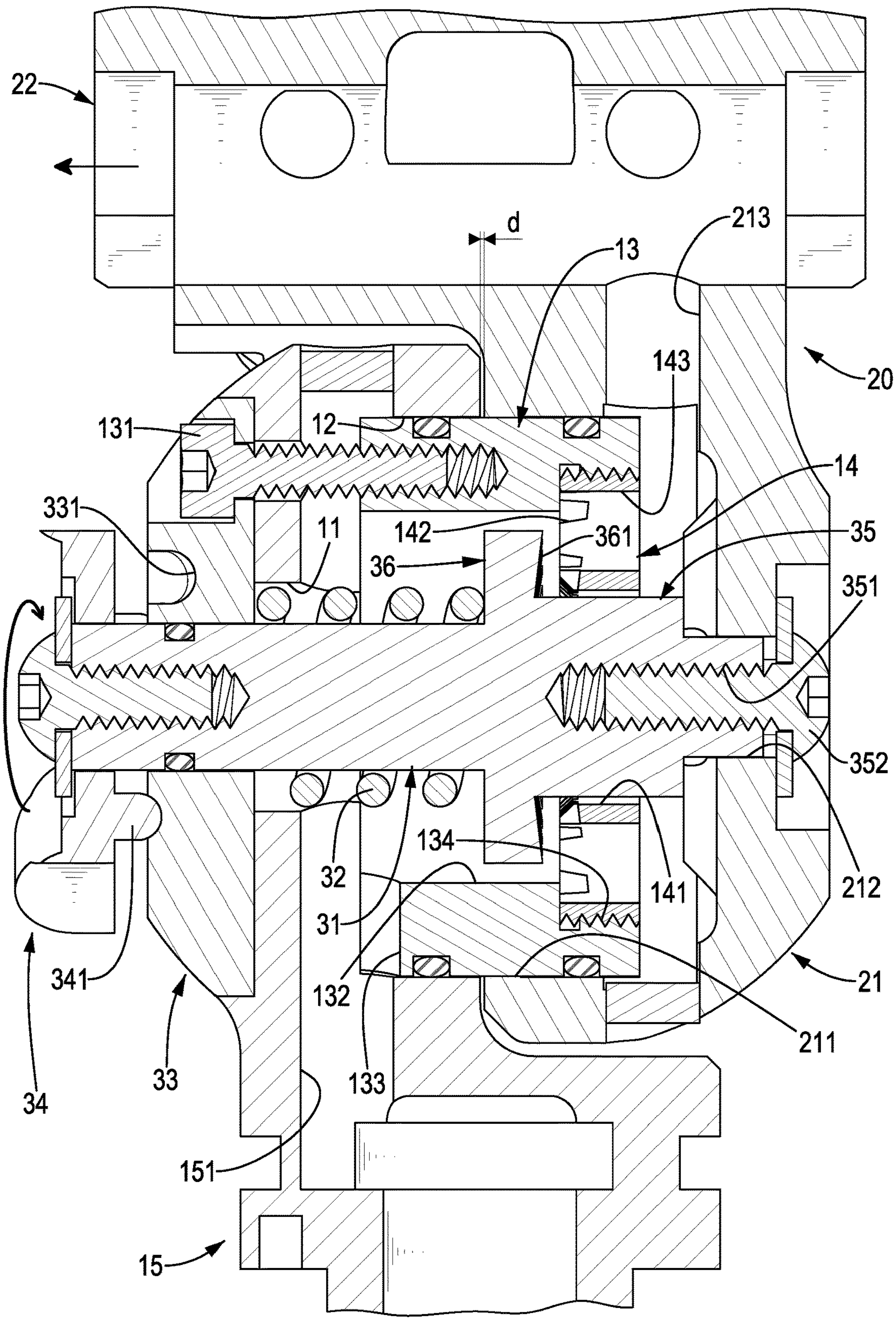
FIG. 8 is an operational side view of the angle-adjustable power tool in FIG. 1 after rotating.
Figure 9:
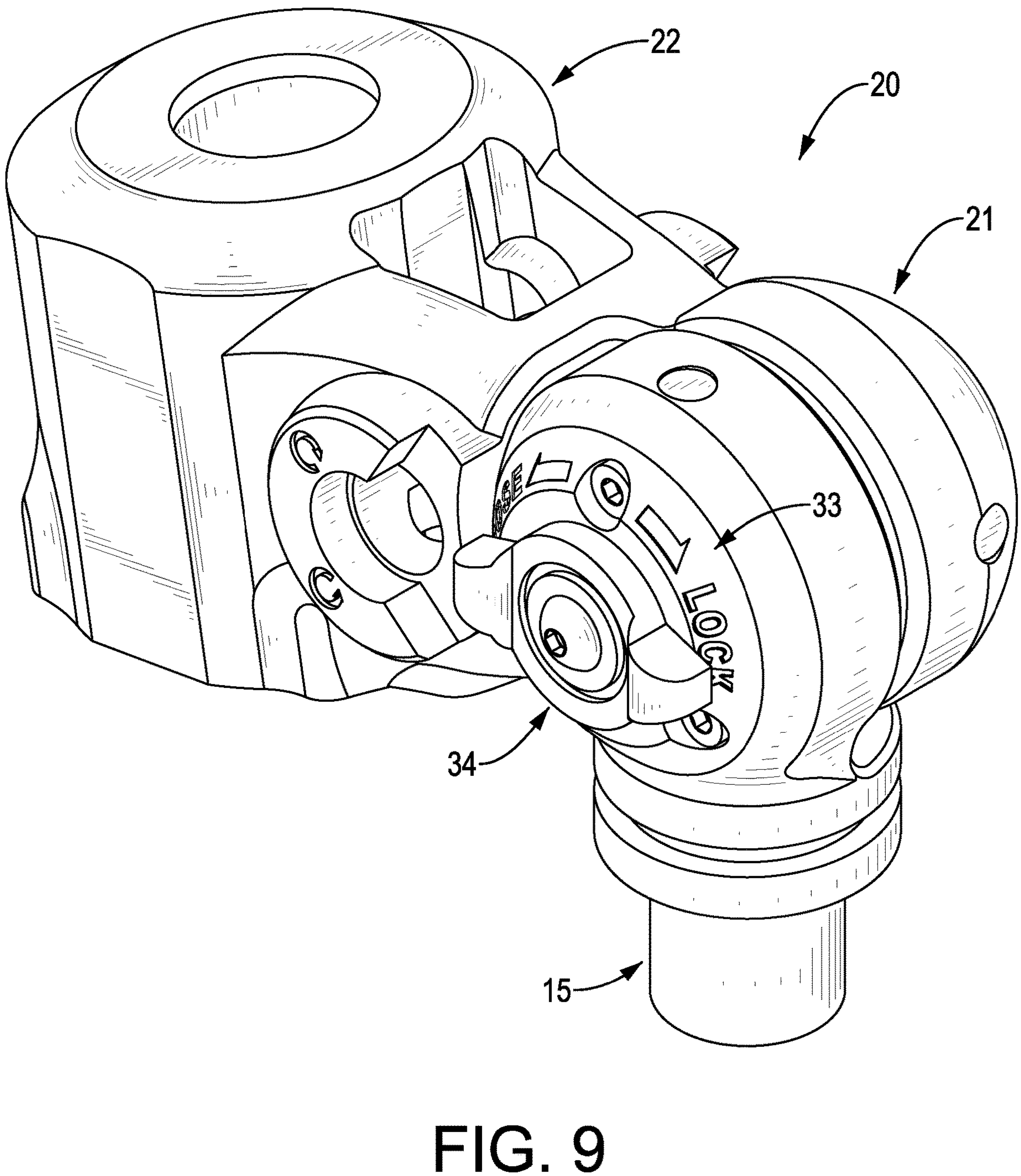
FIG. 9 is an operational perspective view of the angle-adjustable power tool in FIG. 1 after rotating.

With reference to FIGS. 5 and 8, when the angle-adjustable power tool of the present invention is in use, a user wants to adjust an angle of the driving head relative to the handle 10, and the user rotates the toggling element 34 relative to the abutting mount 33 to enable the at least one protrusion 341 to rotate with the toggling element 34 to separate from the at least one sliding slot 331 and to abut against the external surface of the abutting mount 33. Then the toggling element 34 is moved outwardly relative to the connecting head 15, and the positioning mount 31 that is connected securely to the toggling element 34 is moved with the toggling element 34 and is moved relative to the connecting head and the pivot base 21. The positioning disk 36 is moved with the positioning mount 31 to enable the positioning structure 361 of the positioning disk 36 to separate from the multiple engaging units 142 of the engaging disk 14 and to compress the elastic element 32 between the positioning disk 36 and the abutting mount 33. Since the positioning mount 31 is no longer restricted by the engaging disk 14, as shown in FIG. 9, the user can rotate the driving head 20 to change its angle relative to the handle 10 according to the user's needs. As the pivot base 21 is securely connected to the positioning mount 31, the pivot base 21 can be rotated relative to the connecting head 15 by the movement of the positioning mount 31. Then the driving head 20 is moved toward the handle 10 to reduce the gap d between the pivot base 21 and the connecting head 15 as shown in FIG. 8.

Figure 10:
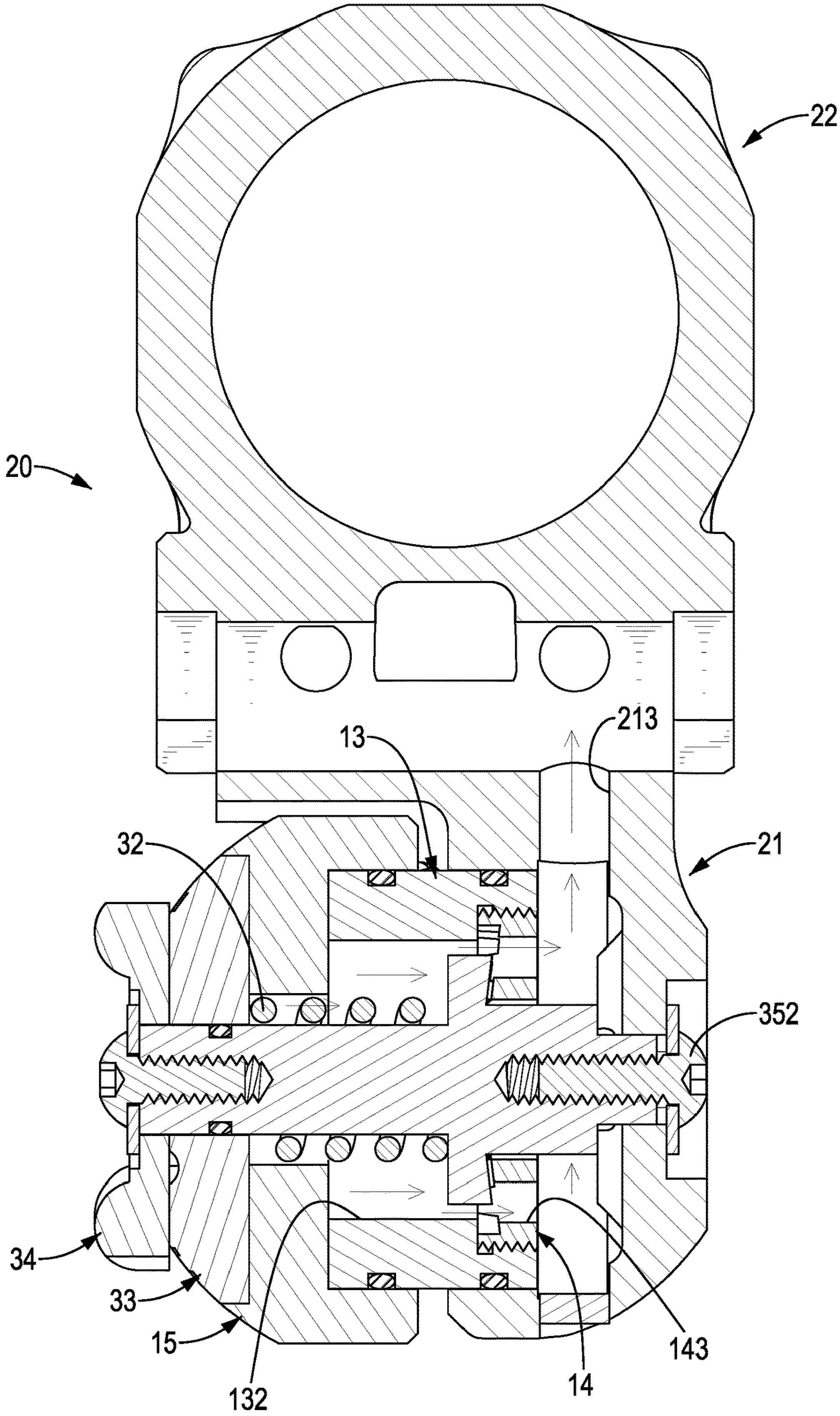
FIG. 10 is a top side view of the angle-adjustable power tool in FIG. 9 after rotating.
Figure 11:
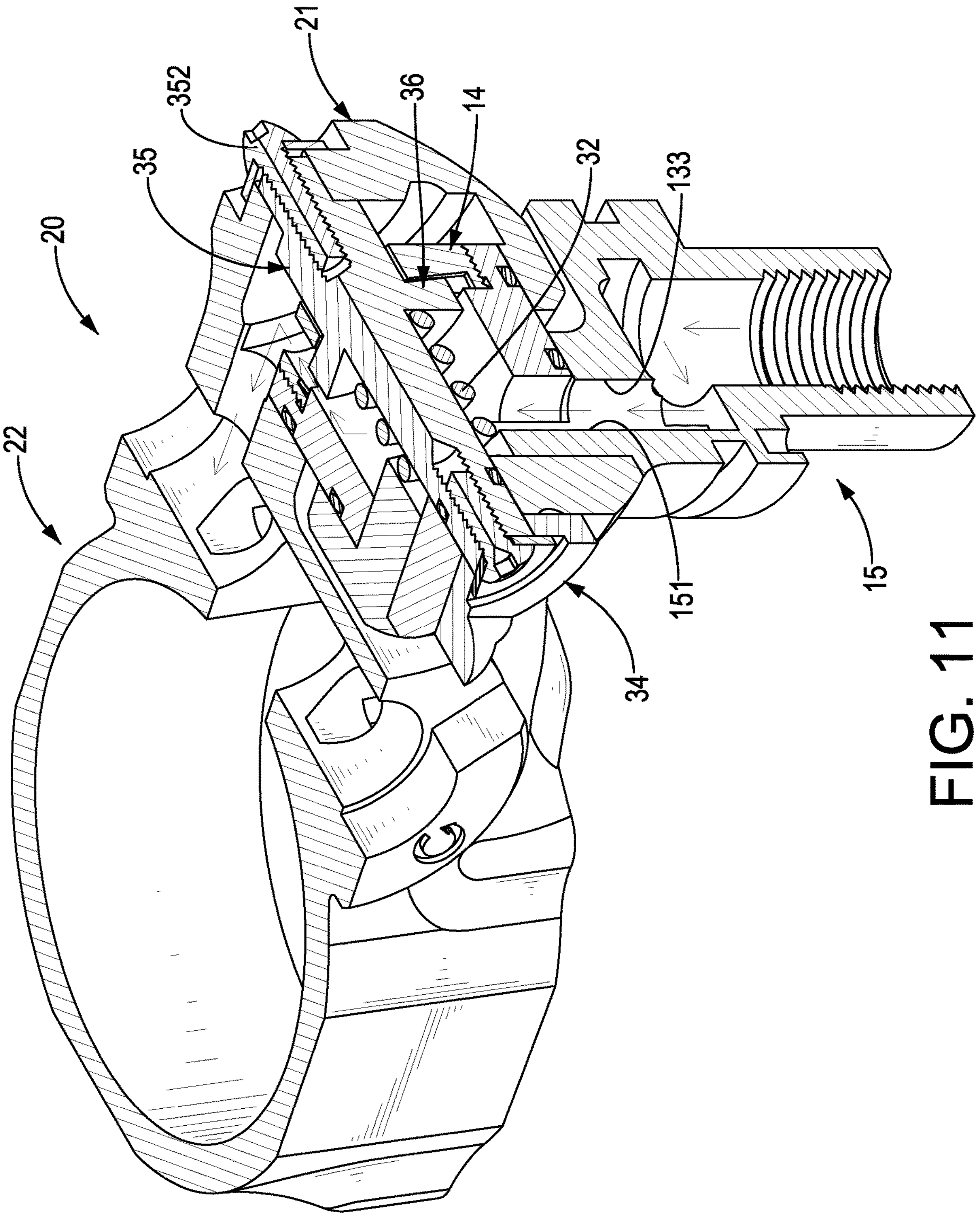
FIG. 11 is a sectional perspective view of the angle-adjustable power tool in FIG. 9 after rotating.

With reference to FIG. 10, after the driving head 20 is rotated to a desired angle, the user can rotate the toggling element 34 to move the at least one protrusion 341 from the external surface of the abutting mount 33 into the at least one sliding slot 331. At this time, the compressed elastic element 32 will push against the positioning disk 36, so that the positioning mount 31 moves away from the connecting head 15 to enable the positioning structure 361 of the positioning disk 36 to engage with the multiple engaging units 142 of the engaging disk 14. Then through the structural relationships between the engaging disk 14, the positioning mount 31, the abutting mount 33, and the toggling element 34, the angle of the driving head 20 is stably and accurately positioned relative to the handle 10 to prevent the driving head 20 from swinging relative to the handle 10 during processing, thereby causing damage to the workpiece and hindering work safety. Since the driving head 20 moves relative to the handle along with the positioning mount 31, the driving head 20 can rotate relative to the handle 10 stably during the process of adjusting the angle of the driving head 20 relative to the handle 10.

Furthermore, with reference to FIGS. 3A to 7, the angle-adjustable power tool of the present invention is provided by the connecting head 15 with the communicating slot 151, the engaging mount 13 with the communicating recess 132, the through hole 141, and the pivot base 21 with the communicating channel 213, so that the high-pressure gas in the housing flows into the head portion 22 of the driving head 20 via the communicating slot 151, the communicating recess 132, the through hole 141, and the communicating channel 213. Then the head portion 22 is driven to process the workpiece without using air channels of complex shapes that make processing difficult, thereby effectively reducing the cost and time required for manufacturing. Furthermore, after the driving head 20 is rotated relative to the handle 10, the high-pressure gas can still flow into the head portion 22 through the communicating slot 151, the communicating recess 132, the through hole 141, and the communicating channel 213.

In addition to pushing the positioning disk 36 and the engaging disk 14 by the elastic element 32 for positioning, the high-pressure gas entering the connecting head 15 through the communicating slot 151 and the communicating recess 132 can also push the positioning disk 36 to firmly engage with the engaging disk 14, so that the driving head 20 of the angle-adjustable power tool of the present invention can be firmly held with the handle before and after the rotation, thereby providing an angle-adjustable power tool with a simple structure, can be positioned accurately, and save cost.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An angle-adjustable power tool comprising a handle, a driving head, and a positioning group, wherein:

the handle has
- an engaging mount mounted in a top of the handle and having
  - a communicating recess formed in the engaging mount; and
  - a fixing recess formed in the engaging mount, communicating with the communicating recess, and faced to the driving head; and
- an engaging disk mounted in the fixing recess of the engaging mount;

the driving head is pivotally connected to the handle and has
- a pivot base disposed in a bottom of the driving head and rotatably connected to the handle to dispose the engaging mount and the engaging disk between the handle and the pivot base; and
- a head portion disposed on a top of the driving head and connected to the pivot base; and the positioning group is disposed between the handle and the driving head to fix an angle of the driving head relative to the handle, and has
- a positioning mount rotatably and movably disposed between the handle and the pivot base, and selectively engaging with the engaging disk;
- an elastic element disposed in the communicating recess of the engaging mount and abutting against the positioning mount to push the positioning mount to engage with the engaging disk;
- an abutting mount disposed on an external surface of the handle opposite to the pivot base, connected securely to the engaging mount, and abutting against the elastic element, the abutting mount having at least one sliding slot formed in an external surface of the abutting mount; and
- a toggling element connected to the positioning mount and rotatably abutting the abutting mount, the toggling element having at least one protrusion formed on and protruding from a side of the toggling element facing the abutting mount, and being selectively mounted in the at least one sliding slot or abutting against the external surface of the abutting mount to move the positioning mount relative to the engaging disk with the rotation of the toggling element;

wherein the toggling element is rotated relative to the abutting mount, the positioning mount is moved by the toggling element to separate from the engaging disk and to compress the elastic element, an angle of the driving head relative to the handle is adjusted via the pivot base, after angle-adjustment, the positioning mount is moved toward and engages with the engaging disk for positioning by the compressed elastic element.

2. The angle-adjustable power tool as claimed in claim 1, wherein the positioning mount has a linking head disposed on one of two ends of the positioning mount and securely connected to the pivot base; and a positioning disk disposed on a middle of the positioning mount, connected to the linking head, movably mounted in the communicating recess of the engaging mount, and selectively engaging with the engaging disk.

3. The angle-adjustable power tool as claimed in claim 2, wherein the engaging disk has multiple engaging units formed on a side of the engaging disk faced to the handle; and the positioning disk has a positioning structure disposed on a side of the positioning disk faced to the multiple engaging units of the engaging disk and selectively engaging with the multiple engaging units.

4. The angle-adjustable power tool as claimed in claim 3, wherein the positioning structure of the positioning disk is a helical gear; and each one of the multiple engaging units of the engaging disk is a helical tooth structure that engages with the helical gear.

5. The angle-adjustable power tool as claimed in claim 4, wherein the engaging disk has at least one communicating hole axially formed through the engaging disk and the multiple engaging units and communicating with the communicating recess.

6. The angle-adjustable power tool as claimed in claim 1, wherein the handle has a mounting recess transversally formed through the top of the handle and faced to the driving head; and a pivot recess transversally formed in the top of the handle and communicating with the mounting recess;

the engaging mount is mounted in the pivot recess; and the elastic element is disposed between the pivot recess and the communicating recess.

7. The angle-adjustable power tool as claimed in claim 6, wherein the handle has a connecting head;

the mounting recess and the pivot recess are formed in the connecting head;

the connecting head has a communicating slot longitudinally formed in the connecting head below the pivot recess and communicating with the pivot recess and a lower portion of the connecting head;

the engaging mount is securely connected to the connecting head and has a notch radially formed in a bottom of a side of the engaging mount faced to the pivot recess and communicating with the communicating recess and the communicating slot;

the pivot base is rotatably connected to the connecting head of the handle and has a connecting recess transversally formed in a side of the pivot base faced to the connecting head; and the engaging mount that extends out of the connecting head is mounted in the connecting recess.

8. The angle-adjustable power tool as claimed in claim 1, wherein the engaging disk has multiple engaging units formed on a side of the engaging disk faced to the handle; and the positioning disk has a positioning structure disposed on a side of the positioning disk faced to the multiple engaging units of the engaging disk and selectively engaging with the multiple engaging units.

9. The angle-adjustable power tool as claimed in claim 8, wherein the positioning structure of the positioning disk is a helical gear; and each one of the multiple engaging units of the engaging disk is a helical tooth structure that engages with the helical gear.

* * * * *